(12) United States Patent
Ide et al.

(10) Patent No.: US 7,316,754 B2
(45) Date of Patent: Jan. 8, 2008

(54) APPARATUS FOR PRODUCTION OF HOLLOW FIBER MEMBRANE MODULE AND METHOD OF PRODUCTION

(75) Inventors: Masaru Ide, Nagoya (JP); Yoshihito Nakahara, Nagoya (JP); Satoshi Suzuki, Nagoya (JP); Kenji Watari, Nagoya (JP); Hiroshi Tasaka, Nagoya (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 222 days.

(21) Appl. No.: 10/505,439

(22) PCT Filed: Feb. 24, 2003

(86) PCT No.: PCT/JP03/01976

§ 371 (c)(1),
(2), (4) Date: Aug. 24, 2004

(87) PCT Pub. No.: WO03/072230

PCT Pub. Date: Sep. 4, 2003

(65) Prior Publication Data

US 2005/0103423 A1    May 19, 2005

(30) Foreign Application Priority Data

Feb. 26, 2002  (JP) .............................. 2002-049489
Jul. 24, 2002  (JP) .............................. 2002-215305

(51) Int. Cl.
*B32B 41/00*  (2006.01)
(52) U.S. Cl. .......................... 156/64; 156/74; 156/358; 156/359
(58) Field of Classification Search .................. 156/64, 156/74, 358, 359, 381, 382; 210/500.23
See application file for complete search history.

(56) References Cited

FOREIGN PATENT DOCUMENTS

JP  53-135892 A  11/1978

(Continued)

*Primary Examiner*—George Koch
(74) *Attorney, Agent, or Firm*—Kendrew H. Colton; Fitch, Even, Tabin & Flannery

(57) ABSTRACT

An object of the present invention is to provide a production apparatus for a hollow fiber membrane module without a risk of deteriorating characteristics of the hollow fiber membranes to be used, with the module case and the hollow fiber membranes bonded and fixed with a potting resin in a highly fluid-tight or airtight manner, and a production method thereof.

A centrifugal type production apparatus (1) for the hollow fiber membrane module, for bonding and fixing at least one end part of the hollow fiber membrane stored in the module case and the module case with each other with the potting resin by utilizing a centrifugal force. The centrifugal force is applied by driving a centrifugal machine (11) while supporting an end part potting working part (3) of the hollow fiber membrane module (2) by a fixing jig (4). The fixing jig (4) comprising a heating means (7) and a temperature detecting means (8) controlling a heating capacity of the heating means (7) based on a difference between a temperature of the fixing jig (4) detected by the temperature detecting means (8) and a setting temperature of the fixing jig (4) preliminarily set in a temperature accuracy range of ±4° C. to the setting temperature. It is also possible to reduce a pressure of the potting working part (3) with a pressure reducing mechanism (17) simultaneously with the centrifugal force application for further preventing generation of leakage of the potting resin.

19 Claims, 3 Drawing Sheets

FOREIGN PATENT DOCUMENTS

| | | |
|---|---|---|
| JP | 59-130502 A | 7/1984 |
| JP | 8-10582 A | 1/1996 |
| JP | 8-10591 A | 1/1996 |
| JP | H11-33366 * | 2/1999 |

* cited by examiner

APPARATUS FOR PRODUCTION OF HOLLOW FIBER MEMBRANE MODULE AND METHOD OF PRODUCTION

CROSS-REFERENCED APPLICATIONS

This application is the National Stage of International Application PCT/JP03/01976, filed Feb. 24, 2003, the complete disclosure of which is incorporated herein by reference, which designated the U.S. and that International Application was not published under PCT Article 21(2) in English.

TECHNICAL FIELD

The present invention relates to a method for producing a hollow fiber membrane module to be used for filtration, separation process, or the like of a liquid or a gas.

BACKGROUND ART

Recently, the membrane modules are used for filtration, separation, or the like of a liquid or a gas widely in the industrial field, the medical field, the food field, or the like. Particularly in the industrial field, a membrane module having a function of filtration of a solvent, separation of a gas in a liquid, pervaporation, or the like is requested.

As the membrane module used in these fields, conventionally, a membrane module using a flat membrane has been used commonly. However, recently, a membrane module using a hollow fiber membrane, which provides a membrane area per volume of the membrane module larger than that of the membrane module using the flat membrane, that is, a hollow fiber membrane module comprising a potting part produced by disposing a hollow fiber membrane in a module case and fixing the module case and the hollow fiber member with each other by bonding with a potting resin in a fluid-tight or airtight manner is used.

Since the filtration or the separation using the hollow fiber membrane module is carried out under the condition with a pressure applied from the primary side to the secondary side, the high sealing property and bonding property are required between the module case and the hollow fiber membrane so that a thermosetting resin such as an epoxy resin and a urethane resin has been used conventionally as the potting resin.

Here, at the time of potting the hollow fiber membrane module with a potting material, in order to realize the high sealing property as mentioned above, a method of disposing the hollow fiber membrane module in a centrifugal separator and applying a centrifugal force to the hollow fiber membrane module by rotating the same has been adopted commonly for facilitating impregnation of the potting resin to a bundle of the hollow fiber membranes.

In the case of potting the conventionally used thermosetting resin such as an epoxy resin and a urethane resin by the centrifugal method, as to the viscosity of the thermosetting resin at a room temperature, since a range without the risk of causing the impregnation failure in the hollow fiber membrane is selected, the impregnation failure cannot be caused basically, and thus the impregnation failure is caused extremely rarely. Therefore, a problem concerning the sealing property or the bonding property has not been generated to the hollow fiber membrane module to be obtained on the whole.

That is, according to the hollow fiber membrane module using the thermosetting resin, although the control of the temperature accuracy at a high level is preferable in terms of the quality control of the hollow fiber membrane module, since the tolerant temperature range in the centrifugal potting method is relatively wide, the need of the control is not high so that a centrifugal type production apparatus comprising a means therefor has not been proposed so far.

In the case the hollow fiber membrane module using a thermosetting resin as the potting resin is utilized for the pervaporation, the filtration of a solvent, the process of a solvent, or the like, depending on the solvent or the chemical, the potting resin is swelled and eluted so as to generate a crack, or the like, and accompanied therewith, a problem of deterioration of the bonding property, generation of leakage, purity deterioration of the processed matter, or the like can be generated.

In order to improve the shortcomings of the potting resin such as an epoxy resin and a urethane resin, a method of obtaining a hollow fiber membrane module by forming a potting part by using a thermoplastic resin such as a polyethylene resin as the potting resin, introducing a molten product of the potting resin among the hollow fiber membranes of a potting working part, and cooling and solidifying the same has been proposed.

For example, according to JP, A, 1-293105, a method having steps of stopping end part of the hollow fiber membrane by preliminarily filling calcium carbonate, or a mixture of calcium carbonate and calcined gypsum into the inside of the end part, filling a potting resin comprising a thermoplastic resin among the hollow fiber membranes, heating to a temperature of 50 to 150% of the melting point of the resin comprising the hollow fiber membrane, potting the outer circumference of the hollow fiber membrane bundle while fastening it with a thermally contracting tape, and eliminating the stopping material using a chemical, wherein a furnace capable of partially heating the hollow fiber membrane module is used as the means for heating the potting resin with the temperature range set at a temperature higher than the melting point of the resin comprising the hollow fiber membrane by 10 to 100° C., preferably by 20 to 50° C. has been proposed. According to the partial heating and the temperature setting, the hollow fiber membranes can be impregnated with the potting resin in a state placed still.

However, according to the production apparatus, the heating temperature range has the 90° C. temperature difference, with the 30° C. temperature difference tolerated in the preferable case, which is set in a still wide temperature range, and thus the degree of contraction or melting of the hollow fiber membranes in the temperature range is not constant.

Furthermore, according to the production apparatus, depending on the potting process in a state placed still, the impregnation of the hollow fiber membranes with the potting resin may not be preferable and the quality of the hollow fiber membrane module to be obtained is not constant.

Moreover, for example, JP, A, 8-266872 discloses a production method using thermoplastic resin powders as the potting resin, the production method comprising the steps of introducing a potting resin among hollow fiber membranes preliminarily separated, placing in a state placed still under a temperature of melting the potting resin using a heater block, taking the hollow fiber membrane bundle into a module case, and further applying a centrifugal force at the time of cooling the same to eliminate the voids generated at the time of cooling, solidification and contraction.

As to the heater block as the constituent member of the production apparatus used in this official gazette, there is no description concerning the control of the melting and heating temperature of the potting resin without paying any attention to the temperature control so that only the operation of melting the potting resin to be used is mentioned.

However, according to the production apparatus, without any special temperature control, the heater block temperature can usually be varied largely so that the viscosity of the molten potting resin can be fluctuated according to the temperature.

Therefore, the quality of the hollow fiber membrane module to be obtained such as the potting resin impregnation property and the bonding property cannot be stable. Moreover, according to the production apparatus, due to potting in a state placed still, the hollow fiber membranes may not be preferably impregnated with the potting resin so that the quality of the hollow fiber membrane module to be obtained is not constant.

Furthermore, according to the production apparatus used in the official gazette, as to the use of the centrifugal separator, only execution of the centrifugal cooling is mentioned without the intention of heating or temperature control thereof.

Therefore, according to the production apparatus disclosed in the official gazette, the viscosity of the potting resin was raised drastically by executing drawing and cooling at the same time without avoiding unimpregnation of the hollow fiber membranes of with the potting resin. As a result, the quality of the hollow fiber membrane module cannot be improved.

Moreover, for example, JP, A, 64-47409 discloses a hollow fiber membrane module with the end part of the hollow fiber membranes fixed with a potting resin having a melting point lower than the hollow fiber membrane. As to the operation of melting the potting resin and the operation of welding and fixing among the hollow fiber membranes, a heating operation is executed with various kinds of heaters, ovens, and ultrasonic welders in a combination with a desired pressuring operation or pressure reduction.

In contrast, the examples thereof disclose that welding and fixing may be executed while applying a vibration or a centrifugal force. As to a specific production apparatus, execution of a heating operation under a vacuum condition using an electric furnace, or furthermore, execution of filling among the hollow fiber membranes with a powdery potting resin using a vibrator at the time of heating are disclosed.

However, according to the electric furnace as the constituent member of the production apparatus, there is no disclosure about the control of the heating temperature. In general, in the case an electric furnace is used at a temperature, the temperature can be higher than the set temperature. Since the viscosity of the molten potting resin is fluctuated according to the temperature so that the quality of the hollow fiber membrane module to be obtained such as the potting resin impregnation property and the bonding property cannot be stable.

Moreover, according to the production apparatus, even in the case of a vacuum state, the impregnation of the hollow fiber membranes with the potting resin cannot be preferable due to the potting process in a state placed still so that the quality of the hollow fiber membrane module to be obtained is not constant.

Furthermore, according to the production apparatus used in the official gazette, also in the case the vibrator and the vacuum source are used in a combination, since the viscosity of the potting resin is not homogeneous, the hollow fiber membranes cannot be impregnated with the potting resin homogeneously. As a result, the quality of the hollow fiber membrane module cannot be stabilized.

Furthermore, according to JP, A, 4-63117 and JP, A, 8-318139, a production method of using a thermoplastic resin powder as the potting resin, impregnating a potting working part of a hollow fiber membrane bundle with a highly concentrated suspension liquid having the resin powder, and heating at a temperature of the melting point of the potting resin or higher and the melting point of the resin comprising the hollow fiber membranes or lower for gradually cooling and solidifying is disclosed.

As the specific production method thereof, a method of using an oven heated to 110 to 120° C., and impregnating the polypropylene hollow fiber membranes with a polyethylene potting resin in a state placed still is disclosed.

However, according to the production method, temperature stains are present between 110 to 120° C., which is an ordinary temperature control range of an oven so that the viscosity of the potting resin differs, and thus the impregnation failure of the potting resin can hardly be avoided in a state placed still.

DISCLOSURE OF THE INVENTION

The present invention has been achieved in order to solve the conventional problems, and an object thereof is to provide a production apparatus for a hollow fiber membrane module without the risk of deteriorating the characteristics of the hollow fiber membranes to be used, with the module case and the hollow fiber membranes bonded and fixed with a potting resin in a highly fluid-tight or airtight manner, and a production method thereof.

The problems can be solved effectively by the production apparatus for a hollow fiber membrane module of the present invention comprising the configuration mentioned below and the production method for the hollow fiber membrane module.

That is, the basic configuration of the apparatus of the present invention is a centrifugal type production apparatus for a hollow fiber membrane module, for bonding and fixing at least one end of a hollow fiber membrane stored in a module case and the module case with a potting resin by utilizing a centrifugal force, comprising a fixing jig having a heating means and a temperature detecting means which fixes a potting working part for bonding and fixing the end part of the hollow fiber membrane and the module case, and a control means for controlling a heating capacity of the heating means based on a calculated value of difference between a temperature of the fixing jig detected by the temperature detecting means and a setting temperature of the fixing jig that is set preliminarily as the principal configuration.

It is preferable that the production apparatus for a hollow fiber membrane module executes a controlling operation in a temperature accuracy range of ±4° C. to the set temperature. Moreover, it is preferable that the centrifugal force applied to the potting working part is in a range of 10 to 100 times of gravity.

Furthermore, it is preferable that the heating means and the temperature detecting means are supported by the fixing jig for disposing the potting working part in a closely contacted state. Then, it is preferable that the heating means is an electric type heater for the convenience of the control.

Moreover, it is preferable that a fluid is sealed in the fixing jig. Furthermore, it is preferable that a control means for controlling the rotational frequency of the fixing jig, and an output control means for controlling the output of the heating means based on the detected information are provided. It is preferable that the fixing jig comprises at least two blocks and comprises a temperature control means for controlling the blocks at different temperatures for enabling a heating operation according to the material.

Furthermore, it is preferable to use a production apparatus for a hollow fiber membrane module comprising a pressure reducing mechanism to make an environment of the potting working part a decompressed condition of 500 hPa or less at the time of a potting work in a state with the centrifugal force applied. Furthermore, it is more preferable that the centrifugal type production apparatus comprises a pressure reducing mechanism to make an environment of the potting working part a decompressed condition of 350 hPa or less.

In the case the environment of the potting working part is made to a reduced pressure state simultaneously with the application of the centrifugal force and it is returned to an ordinary pressure after sufficiently spreading the potting resin between the hollow fiber membrane, bubbles present inside the potting resin can be reduced dramatically by the atmospheric pressure so that generation of leakage due to communication of the bubbles can certainly be reduced.

In the case the potting resin is a thermoplastic resin, in order to improve the dispersion property of the potting resin, it is preferable that the potting resin is thermoplastic resin fine particles so that the potting working part is filled with a mixture of the thermoplastic resin fine particles and a liquid. It is preferable that the potting resin is a polyolefin based resin or a polyethylene resin.

In contrast, it is preferable that the resin comprising the hollow fiber membrane is a thermoplastic resin. In this case, it is preferable that it is a polyolefin-based resin or a polyethylene resin like the potting resin.

Moreover, it is preferable that the filling ratio of the hollow fiber membrane to the module case capacity is 20% or more and 60% or less.

As the hollow fiber member used in the hollow fiber membrane module of the present invention, various ones can be used. For example, hollow fiber membranes comprising various materials such as cellulose based one, polyolefin based one, polyvinyl alcohol based one, PMMA (polymethyl methacrylate) based one, polysulfone based one, fluorine based one like PVDF and PTFE can be used. In particular, in terms of the stability of the formed film at the time of obtaining the hollow fiber membrane, the chemical resistance, common separating performance and processing performance, or the like, a hollow fiber membrane of a thermoplastic resin is used.

In terms of the flexibility of the hollow fiber membrane, the strength, the material chemical resistance, the low cost performance, or the like to be required at the time of processing for obtaining the hollow fiber membrane module, a hollow membrane made of a tetrafluoroethylene based resin and a polyolefin based resin are particularly preferable. In particular, a hollow fiber membrane made of a polyethylene, a polypropylene, a poly(4-methyl-1-pentene), or the like is preferable.

The hollow fiber membrane may either be a porous film to be used for ordinary filtration or a non-porous homogeneous film to be used for the gas separation, or the like. Moreover, as to the film structure, it may be a film having an even internal structure or a composite film comprising a porous layer and a homogeneous layer.

As the module case for storing the hollow fiber membrane, a metal or resin case can be used. In terms of the processing property of the module case, the price, or the like, it is made of preferably a resin. For example, a case made of a polyvinyl chloride resin, a polycarbonate resin, an ABS resin, an acrylic based resin, a polyolefin based resin, a polysulfone based resin, a polyphenylene oxide based resin, a polyacetal based resin, or the like is preferable.

Particularly in the case of providing a hollow fiber membrane module supplied for the application of filtration of a solvent, separation of a gas from a solvent, pervaporation, or the like, since the solvent resistance and the low elution property are required to the hollow fiber membrane module, it is preferably a module case made of a polyolefin based resin such as a polyethylene and a polypropylene also in consideration of the bonding property to the potting resin, or the like.

Moreover, a cap, an inlet, an outlet, or the like are mounted to the hollow fiber membrane module for the introduction of the fluid to be processed into the module and the discharge of the processed fluid from the inside of the module. The cap material at the time is not particularly limited, and in consideration of the mounting convenience to the module case, the application of the hollow fiber membrane module, or the like, it is preferable to select a cap made of a material according to the material of the module case, and it can be mounted by an optional method such as bonding, welding, and screwing.

As the potting resin for bonding and fixing one end or both ends of the hollow fiber membrane made of a thermoplastic resin stored in the module case with the module case, a thermosetting resin can be used in addition to the thermoplastic resin.

As the thermosetting resin, an epoxy resin, an unsaturated polyester resin, a polyurethane resin, or the like can be used, and it can be selected optionally. Moreover, although the viscosity of the thermosetting resin before solidification to be potted is not particularly limited, as a viscosity range to be influenced hardly by the centrifugal force or the resin temperature, consequently providing a good resin impregnation property in the hollow fiber membrane, and at the same time, capable of preventing choking inside the hollow fiber membrane by the permeation into the hollow fiber membrane, it is used preferably at 50 to 5,000 mPa·s, more preferably at 200 to 3,000 mPa·s.

In contrast, as the thermoplastic resin as the potting resin, a silicone based filling agent and various kinds of hot melt resins can be used. In terms of the resistance with respect to various kinds of solvents and chemicals, the mechanical strength, or the like, a polyolefin-based resin is preferable. Among the polyolefin-based resins, in terms of the handling property at the time of the potting process, the low elution to the chemicals, or the like, a polyethylene resin and a polypropylene resin are preferable.

In the case the weight average molecular weight of the thermoplastic resin to be used as the potting resin is less than 10,000, the mechanical strength and the toughness of the potting part of the hollow fiber membrane module to be obtained become insufficient so that the durability for the long term use, the shock resistance, or the like cannot be obtained. Therefore, it is preferable to use a thermoplastic resin having a 10,000 or more weight average molecular weight as the potting resin.

According to a production method of a hollow fiber membrane module of the present invention, an operation of bonding and fixing the end parts of the hollow fiber membrane and the module case with the potting resin can be executed as follows.

For example, the operation can be executed by taking a plurality of hollow fiber membranes as a hank so as to provide a hollow fiber membrane bundle, aligning at least one side end part of the hollow fiber membrane, and temporarily fixing the bundle end part optionally with an adhesive or by thermal fusion, including closure of the opening part in the case there is a hollow fiber membrane opening part.

Or, a sheet like hollow fiber membrane knitted fabric with one or a plurality of hollow fiber membrane folded back by a predetermined length, with the adjacent end parts in a folded loop like form bound with a thread is wound spirally parallel to the hollow fiber membrane arrangement direction, that is, the sheet like hollow fiber membrane knitted fabric is wound around like a screen, parallel to the hollow fiber membrane arrangement direction so as to provide a hollow fiber membrane bundle.

By utilizing the hollow fiber membrane comprising a sheet like hollow fiber membrane knitted fabric, not only the hollow fiber membrane can be disposed evenly in the module case but also the end part offsetting process, the temporary fixing process for the purpose of closing the opening part, or the like can be eliminated.

The operation of filling the potting working part with a thermoplastic resin as the potting resin may be executed either simultaneously with formation of the hollow fiber membrane bundle by binding the hollow fiber membrane or after the formation of the hollow fiber membrane bundle as long as the outer surface and the hollow fiber membranes of the hollow fiber membrane bundle in the potting working part is filled with the thermoplastic resin as the potting resin evenly. At the time, by using a suspension of a powdery thermoplastic resin dispersed in a liquid, the even filling operation can be facilitated.

After filling the potting working part with the potting resin, heating and application of the centrifugal force may be executed as it is, however, by removing a part of the liquid filling the potting working part together with the thermoplastic resin prior to the heating and centrifugal force application, the potting process can be executed effectively.

That is, by preliminarily removing a part of the liquid filling the potting working part together with the thermoplastic resin, the liquid to be evaporated in the heating and centrifugal force applying process can be restrained to the minimum level. Since the energy efficiency is improved and the liquid evaporating time can be shortened thereby so as to improve the productivity, it is preferable.

Subsequently, after storing the hollow fiber membrane bundle in the module case, with the hollow fiber membranes evenly filled with the potting resin in the potting working part, a potting process of applying the centrifugal force to the potting working part while rotating the module case and heating is executed.

Accordingly, by stopping the application of the centrifugal force and cooling after applying the centrifugal force to the potting resin filling the potting working part for spreading the potting resin between the hollow fiber membranes evenly and sufficiently, the thermoplastic resin as the potting resin can be solidified. The method for cooling after stopping the centrifugal force application can be selected optionally, and it may be either be quick cooling or slow cooling.

Subsequently, by cutting the end part of the hollow fiber membrane with the potting process applied by an ordinary method so as to form an opening end part after cooling and solidifying the potting resin, the purposed potting part is obtained.

Although the filling ratio of the hollow fiber membrane in the potting working part in the module case is not particularly limited, in consideration of the processing performance per one module, the dispersion homogeneity of the hollow fiber membrane in the module, alleviation of the internal stress by the volume contraction by heating and cooling of the potting resin, or the like, the filling ratio of 20% or more is preferable, and in consideration of the even introduction of the potting resin into the hollow fiber membranes, the filling ratio of 60% or less is preferable.

These hollow fiber membrane modules are produced by a centrifugal type production apparatus for the capability of realizing a good impregnation property of the potting resin in the hollow fiber membrane.

BRIEF DESCRIPTION OF THE DRAWINGS

FIG. 5 is a schematic explanatory diagram showing the process state of a centrifugal type production apparatus of the present invention, one end potting working part in the hollow fiber membrane longitudinal direction of a hollow fiber membrane module by the apparatus, a low pressure mechanism, or the like.

FIG. 6 is a schematic explanatory diagram showing the process state of a centrifugal type production apparatus of the present invention, both end potting working part in the hollow fiber membrane longitudinal direction of a hollow fiber membrane module by the apparatus, a low pressure mechanism, or the like.

BEST MODE FOR CARRYING OUT THE INVENTION

Hereinafter, a centrifugal type production apparatus for a hollow fiber membrane module as the best mode for carrying out the invention will be explained specifically with reference to the drawings.

Figure 1:
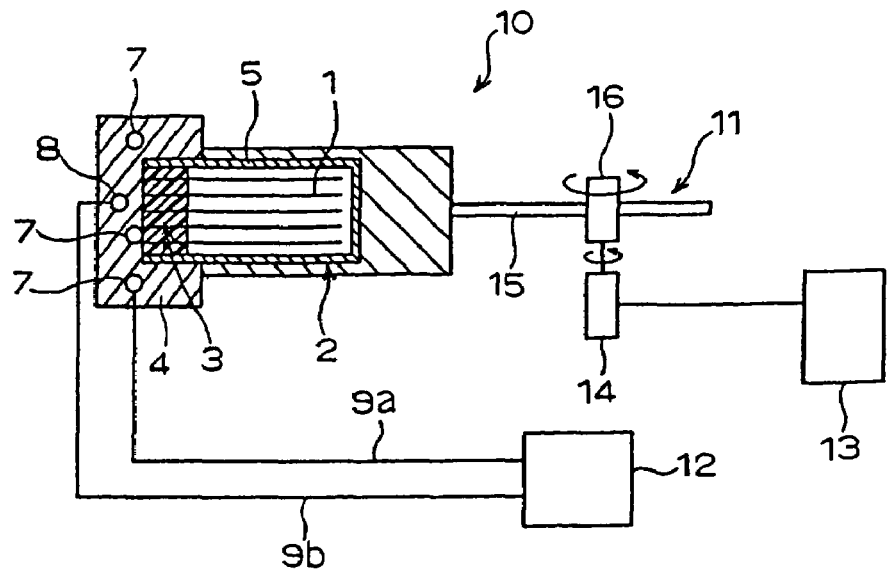
FIG. 1 is a schematic explanatory diagram showing the process state of a centrifugal type production apparatus of the present invention and one end potting working part in the hollow fiber membrane longitudinal direction of a hollow fiber membrane module by the apparatus.

FIG. 1 is a processing explanatory diagram schematically showing a centrifugal production apparatus of the present invention, and the operation state at the time of potting process of one end part in the hollow fiber membrane longitudinal direction of a hollow fiber membrane module using the apparatus.

Figure 2:
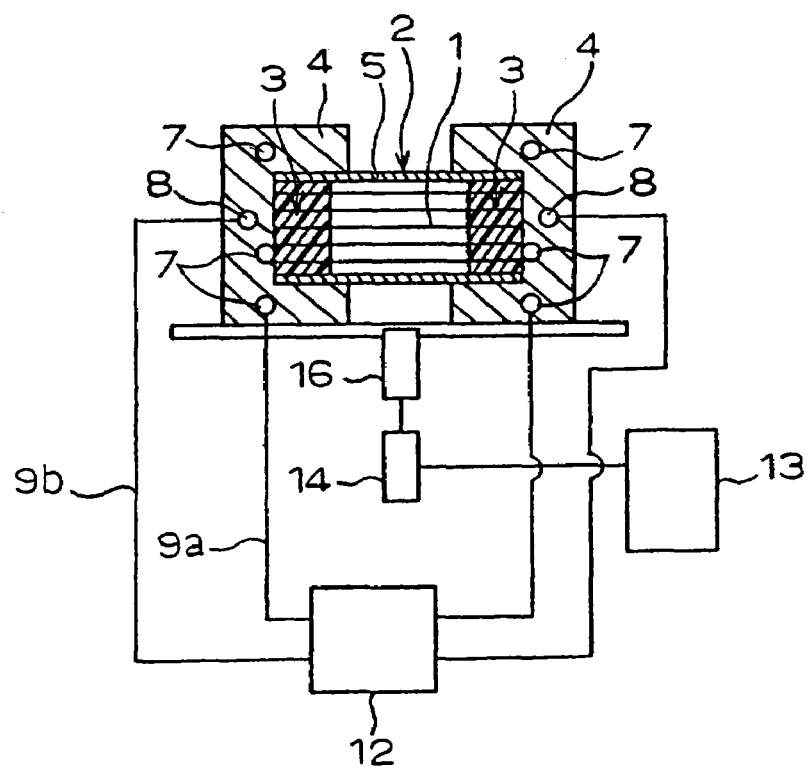
FIG. 2 is a schematic explanatory diagram showing the process state of a centrifugal type production apparatus of the present invention and both end potting working part in the hollow fiber membrane longitudinal direction of a hollow fiber membrane module by the apparatus.

FIG. 2 is a processing explanatory diagram schematically showing a centrifugal production apparatus of the present invention, and the operation state at the time of potting process of both end parts in the hollow fiber membrane longitudinal direction of a hollow fiber membrane module using the apparatus.

The centrifugal type production apparatus 10 of the present invention comprises a centrifugal machine 11, a temperature control part 12, and a rotation control part 13. A centrifugal machine 11 comprises a rotation driving part 14 for receiving a command from the rotation control part 13 for controlling the drive rotation speed thereof, a vertical rotation axis 16 to be rotated, following the output axis of the rotation driving part 14, and a shaft 15 elongating horizontally from the rotation axis 16. A fixing jig 4 for fixing and supporting a potting working part 3 of a hollow fiber membrane module 2 filled with a large number of hollow fiber membranes 1 is fixed on the top end part of the horizontal shaft 15.

In the inside of the fixing jig 4, for example, a heating means 7 such as an electric thermal heater and a temperature detecting means 8 such as a temperature measuring resistor are embedded so that a temperature detection signal of the fixing jig 4 detected by the temperature detecting means 8 is transmitted to the temperature control part 12. A preferable temperature of the fixing jig 4 is preliminarily set in the temperature control part 12 so that the output of the heating means 7 can be controlled by calculating the difference of the real temperature transmitted from the detection temperature signal and the set temperature by an unshown calculating part so as to have the size of the calculated value according to the preliminarily set value range.

According to the present invention, it is preferable that the temperature control of the fixing jig 4 is executed with the size of the calculated value set in a range of ±4° C., and it is more preferable that the temperature control of the fixing jig 4 is executed in a range of ±2° C.

The fixing jig 4 for fixing and supporting the potting working part 3 has a shape of enveloping mainly the potting working part 3. In general, it comprises a cylindrical member having a bottom in many cases, however, it is not limited thereto. Moreover, although the depth in the hollow fiber membrane 1 longitudinal direction in the potting working part 3 is not particularly limited, a length equal to the hollow fiber membrane longitudinal direction length at the time of filling the hollow fiber membranes 1 of the potting working part 3 with the potting resin in a heated state, or a length slightly longer than the length is preferable. By providing the same in such a length, the influence by the heat to the hollow fiber membrane 1 other than the potting working part 3 can be restrained to the minimum level.

That is, in the case the heat resistance of the used hollow fiber membrane 1 is low so as to generate contraction, fusion, performance deterioration, or the like by heating, it is preferable to locally heat only the potting working part 3 and apply the centrifugal force.

Figure 3:
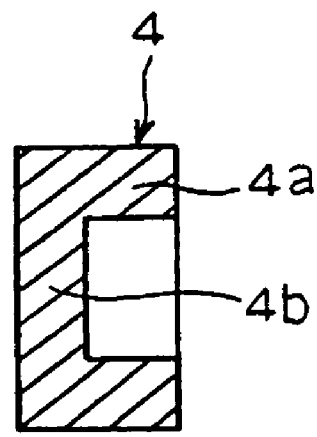
FIG. 3 is a cross sectional view showing an embodiment of an integrated type fixing jig to be used for a centrifugal type production apparatus of the present invention.
Figure 4:
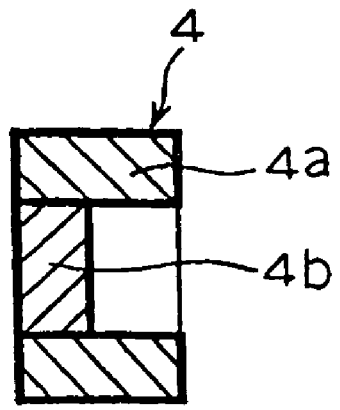
FIG. 4 is a cross sectional view showing an embodiment of a split type fixing jig to be used for a centrifugal type production apparatus of the present invention.

The fixing jig 4 of such a shape may have an integrated structure as shown in the cross sectional view of FIG. 3, and it is also preferable to have a structure split into a side wall part 4a to be contacted with the circumference of the potting working part 3, and a bottom part 4b to be contacted with the cross sectional direction of the potting working part 3 as shown in the cross sectional view of FIG. 4.

Because the side wall part 4b poses the thermal influence to the potting resin disposed in the potting working part 3 via the module case 5. In contrast, in the case the module case is not provided in the cross sectional direction of the potting working part 3, the bottom part 4b poses the thermal influence directly to the potting resin. Therefore, as to the material and the size of the module case 5 to be used, the production condition corresponding to various hollow fiber membrane modules can be set by providing the side wall part 4a and the bottom part 4b of different materials and structures, with the heating means 7 and the temperature detecting means 8 directly supported thereby and having the temperature control part 11 independently.

Moreover, as to the split structure, it is not limited to the configuration split in two, and it is also preferable to control the temperatures with the side wall part 4a and the bottom part 4b further split.

Moreover, in the case an indirect heating operation of heating via an air layer is executed, compared with the production method by the direct heat transmission comprising the production apparatus of the present invention, since the heat transmitting efficiency is lowered naturally so that the production efficiency is deteriorated drastically, it is important to support the potting working part 3 via the fixing jig 4.

Also in terms of not generating local temperature stains in the potting working part 3 supported by the fixing jig 4, it is preferable to have the potting working part 3 and the fixing jig 4 in a closely contacted state without generating a gap as much as possible. It is preferable to adopt for example the fixing jig 4 according to the kind and the shape of the potting working part 3 for the realization thereof.

Although the material of the fixing jig 4 is not particularly limited, since the fixing jig 4 comprises the heating means 7 and the function of transmitting the quantity of heat thereof to the potting working part 3, as the material of the fixing jig 4, it is preferable to use a highly heat transmissible material such as a metal, and in particular, an aluminum is further preferable.

It is important that the fixing jig 4 comprises the heating means 7. That is, as to the heating means 7, at least a performance of heating the potting working part 3 is required to the fixing jig 4, however, in the case of heating from the outside, for example as in far infrared ray heating, that is a case that the fixing jig 4 itself does not support the heating means, the sufficient heating may not be provided due to the heat transmission resistance of the air layer. Besides, according to the centrifugal type production apparatus 10, due to generation of the wind speed by the rotation, the outer surface of the fixing jig 4 not to be contacted with the potting working part 3 is cooled down, and consequently the obtained temperature differs drastically from the set temperature. Moreover, the temperature of the fixing jig 4 to be obtained at the time of changing the rotational frequency is changed and at the same time, it causes the local temperature stains of the fixing jig 4. As a result thereof, the risks of incapability of obtaining a preferable hollow fiber membrane module, deterioration of the production yield, or the like are generated. Besides, it is extremely difficult to avoid the same.

As to the heating means 7 without interposing the air, the method is not limited, and a known method such as an electric heater, a heat conduction medium liquid, and induction heating can be used. As shown in FIG. 1, according to the production apparatus of the present invention, since the fixing jig 4 is rotated around the rotation axis 16 via the shaft 15, in the case of using a heat medium as the heating method, it is not easy to solve the installation of the supply piping and the sealing property.

Moreover, although use of the induction heating method is preferable in terms of eliminating the wiring installation in the periphery of the rotational axis 16 as mentioned above, on the other hand, in the case of changing the rotational frequency, the supplied energy should be controlled according thereto so that the control operation can be complicated.

In view of these elements, use of the electric heater as the heating means 7 is preferable also in terms of the installation of a cable for the heating means 9a and a cable for the temperature detecting means 9b because they can be installed using a known technique such as a slip ring in the rotational axis 16 peripheral part, the heater itself is inexpensive, and the influence of the rotational frequency of the fixing jig 4 can be avoided.

As to the heating operation at the time of executing the potting process, it is preferable that the potting working part 3 is disposed in the fixing jig 4 closely contacted with the heating means 7. That is, in the potting working part 3, the quantity of heat sufficient for melting and softening the potting resin via the fixing jig 4 by the heating means 7 is needed, and the operation of heating evenly is important.

For that, direct transmission of the heat from the heating means 7 to the potting working part 3 via the fixing jig 4 is preferable. Moreover, since the temperature control of the potting working part 3 can be enabled by sufficiently administering the temperature of the fixing jig 4 to be heated by the heating means 7, it is preferable to closely contact the fixing jig 4 and the heating means 7 and to support the potting working part 3 by the fixing jig 4 in a closely contacted state.

In contrast, as to the temperature detecting means 8 for the temperature control of the fixing jig 4, it is preferable to closely contact the same with the fixing jig 4 as in the case of the heating means 7 for enabling the accurate temperature detection.

It is necessary that the fixing jig 4 comprises the temperature detecting means 8. According to the production apparatus of the present invention, although the potting working part 3 is supported by the fixing jig 4, one of the principal purposes of the present invention is to detect and control the temperature of the potting working part 3. However, since it is practically difficult to directly measure the internal temperature of the potting working part 3 since it may lead to the defect of the hollow fiber membrane module 2, it is important to detect the temperature of the vicinity of the potting working part 3 as much as possible. Therefore, the fixing jig 4 comprises the temperature detecting means 8.

As to the kind of the temperature detecting means 8, it is not particularly limited, and a known detecting means such as a temperature measuring resistor and a thermocouple can be used. It is most preferable to use a temperature measuring resistor in terms of the detected temperature accuracy and the detection reproductivity, and it is preferable to use a thermocouple in terms of the response and the cost performance.

As to the mounting position of the temperature detecting means 8 onto the fixing jig 4, as mentioned above, for detecting the temperature of the potting working part 3 as accurately as possible, it is preferably between the heating means 7 to be supported and the potting working part 3. In particular, it is further preferably in the vicinity of the potting working part 3.

According to the centrifugal type production apparatus 10 of the present invention, the heating temperature of the fixing jig 4 is controlled by the temperature control part 12, using the heating means 7 and the temperature detecting means 8 mounted on the fixing jig 4. As to the temperature control of the fixing jig 4, the requested setting temperature data and preferably the temperature raising attaining time data are inputted preliminarily in the temperature control part 12 so that the temperature data detected by the temperature detecting means 8 are compared with the setting temperature data in the calculation comparison part thereof for judging the excess and deficiency of the detected temperature data to the setting temperature data for controlling the drive of the heating means 7.

The controlling method is not particularly limited, and a known method can be used. For example, a method commonly called as the ON-OFF control of turning on the electric heater in the case the detected temperature data is insufficient to the setting temperature data, and turning the same off in the case it is excessive can be used.

Among the controlling methods, as a method of having the temperature of the fixing jig 4 within ±4° C. to the setting temperature, a method of multiplying the difference of the detected temperature and the setting temperature by a specific coefficient and controlling the voltage to be applied to the electric heater based on the calculation result, and a method of controlling the time of turning on the electric heater similarly by the calculation result can be presented.

These methods are called the PID control, and it is important in terms of accurately controlling the temperature of the fixing jig.

One of the important points of these controls for having the temperature accuracy of the fixing jig 4 within ±4° C. to the setting temperature is to determine the specific coefficient, and it is preferable that the coefficient is always corrected.

As to the correction method, there is a method of determining the coefficient randomly and gradually changing the coefficient by the manual input while measuring the temperature accuracy of the fixing jig 4. However, by adopting a method of taking in the temperature accuracy of the fixing jig 4 in the temperature control part 12 for automatically correcting the coefficient, the temperature accuracy can further be improved, and thus it is a preferable method.

Moreover, another important point for the control within ±4° C. to the setting temperature is the number of reading per unit time of the temperature data to be detected by the temperature detecting part, that is, the number of sampling. In the case the number of sampling is small, in the case the temperature of the fixing jig 4 is changed by the next sample detection the heating means can hardly be driven appropriately, and as a result the temperature accuracy of the fixing jig 4 is deteriorated.

Therefore, it is preferable to operate the heating means based on the more strict detected temperature data with a sufficient number of sampling. The interval of the temperature detection is preferably 1 second or less, more preferably 0.1 second or less, and much more preferably 0.01 second or less.

According to the centrifugal type production apparatus 10 of the present invention, as mentioned above, by comprising the temperature control part 12 capable of these controls, the temperature of the fixing jig 4 to the setting temperature can be controlled within a range of ±4° C. As to the temperature range, since the required temperature range differs depending on the kind of the potting resin to be used for the hollow fiber membrane module, in the case a potting resin having a relatively low viscosity is used under a specific temperature condition, production can be executed with the quality of the hollow fiber membrane module to be obtained preferably and stably on the whole even if the required temperature range is relatively wide.

However, in the case a potting resin having a relatively high viscosity is used under a specific condition, the impregnation property between the hollow fiber membranes 1 is not good. Particularly in the case a potting resin to have a lower viscosity at a low temperature is used, it is preferable to heat the potting resin at a temperature as high as possible in a range without generating a trouble of crush due to melting and softening of the hollow fiber membranes 1 for ensuring a good quality of the hollow fiber membrane module. Since the hollow fiber membranes are melted and softened by slight temperature fluctuation or error, or failure is generated in terms of the potting resin impregnation property, it is important to maintain the extremely sensitive thermal balance, and thus the required temperature range should be narrow.

Therefore, it is an extremely effective means to control the temperature within a range of ±4° C. to the setting temperature, using the centrifugal production apparatus 10 of the present invention.

Furthermore, it is more preferable to have the temperature range within ±2° C. for obtaining a hollow fiber membrane module with a good quality.

As heretofore described, by executing a good thermal transmission in terms of the material and the structure of the fixing jig 4 and controlling the heating temperature, the fixing jig 4 can be in a preferable temperature range with respect to the setting temperature. It is also possible and preferable to employ other methods.

For example, by sealing a fluid such as a gas and a liquid having a good flowability inside the fixing jig, for example, even in the case a part of a plurality of heat generating heater looses the heating capacity due to disconnection, or the like so that a part of the fixing jig cannot be heated, the fluid sealed in the fixing jig 4 can move quickly, and as a result, the temperature of the fixing jig 4 can be maintained evenly.

In contrast, as mentioned above, in the case of using a potting resin having a high viscosity, even if the hollow fiber membranes are heated in a range without melting and softening, the impregnation of the hollow fiber membranes 1 with the potting resin cannot be sufficient in many cases, and thus it is important to adopt the centrifugal method as one of the functions of the production apparatus of the present invention.

According to the centrifugal type production apparatus 10, it is preferable to apply a centrifugal force of 10 to 100 times of the gravity to the potting working part 3. That is, in the case a centrifugal force of less than 10 times of the gravity is applied to the potting working part 3, even in the case of the potting resin in a softened state, heated within the processing temperature range, if the fiber membrane bundle comprises a large number of hollow fiber membranes 1, or the filling ratio of the hollow fiber membranes 1 is high, it is difficult to impregnate between the hollow fiber membranes with the potting resin so as to generate the voids or pores in the potting working part. In contrast, in the case a gravity more than 100 times of the gravity is applied to the potting working part, there is the risk of bending the hollow fiber membranes 1 due to the gravity so as to cause deterioration of the separation performance of the hollow fiber membranes or the transmission performance, damage of the hollow fiber membranes, or the like.

Therefore, the centrifugal force to be applied at the time of executing the potting process is preferably 10 to 100 times of the gravity and more preferably, 20 to 80 times of the gravity.

The centrifugal type production apparatus 10 of the present invention rotates around the rotation axis 16 via the shaft 15, and as mentioned above, it comprises the fixing jig 4 to be heated by the heating means 7 via the temperature control part 12, or the like. That is, the apparatus comprises the rotation control part 13 for controlling the rotational frequency of the rotation drive part 14 for providing the rotation to the fixing jig 4, and the temperature control part 12 for controlling the output of the heating means 7 based on the detection information, and it is preferable that the rotation control part 13 is provided independently from the temperature control part 12.

The rotation driving part 14 is for rotating the rotation axis 16 for example as a motor, and the type can be selected according to the various rotation controlling methods. Moreover, it is preferable that the rotation driving part 14 rotates the rotation axis 16 by the rotational frequency via a speed reduction gear, or the like although it is not shown in the figure.

As the rotation controlling method, it is preferable to use the inverter control as a common method in terms of the cost and the convenience of the apparatus design and production.

Figure 5:
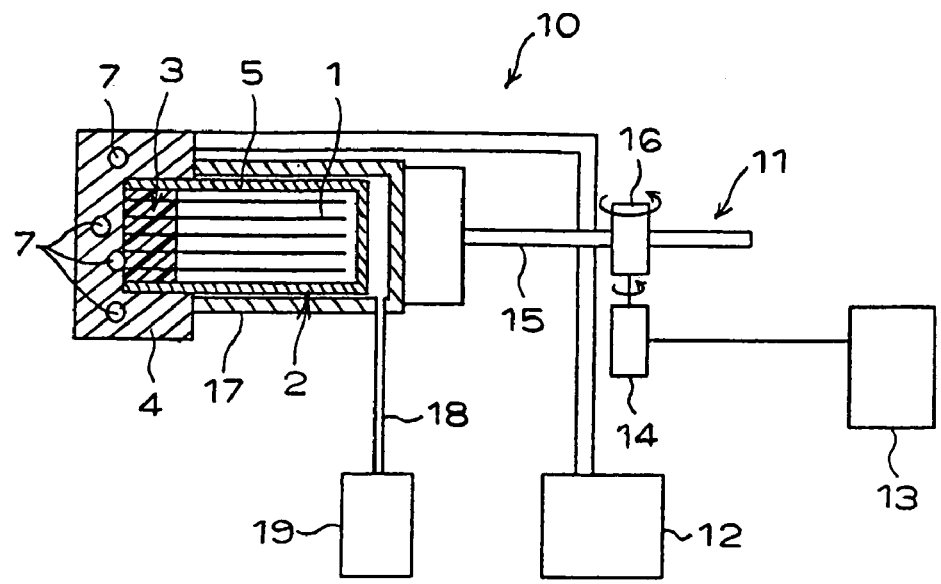
Figure 6:
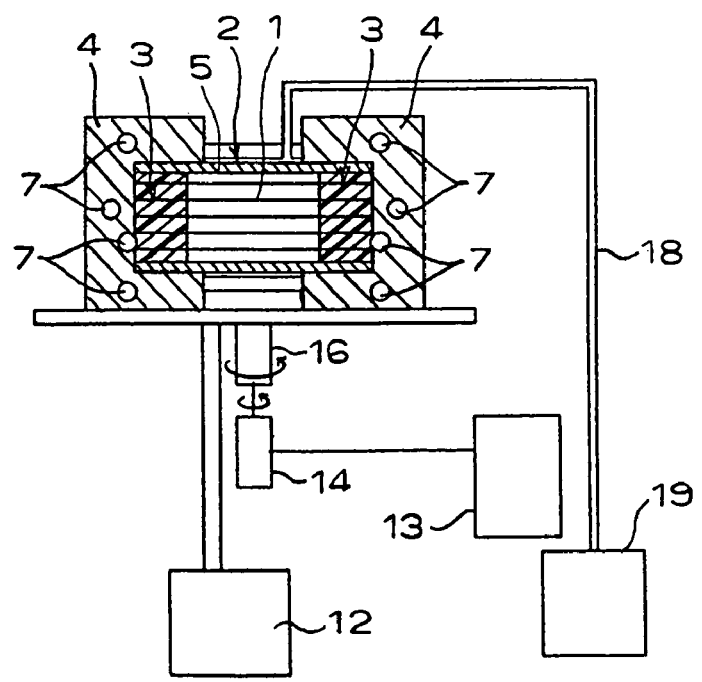

The centrifugal type production apparatus 10 of the present invention may comprise a pressure reducing mechanism 17 to have the environment of the potting working part under a reduced pressure atmosphere as shown in FIGS. 5 and 6 in the case of potting in a state with the centrifugal force applied to the potting resin.

The environment of the potting working part at the time is preferably under a reduced pressure atmosphere of 500 hPa. That is, at the time of impregnating between a large number of the hollow fiber membranes with the potting resin, the centrifugal force is applied as mentioned above for improving the impregnation effect, and at the same time, it is in a reduced pressure state, and after sufficiently spreading the potting resin between the hollow fiber membranes, it is returned to the ordinary pressure after finishing the potting process. Thereby, the bubbles inside the potting resin can be reduced dramatically by the atmospheric pressure, and as a result, tendency of reducing leakage derived from the communication of the bubbles is generated.

It is an effective means to provide the pressure reducing mechanism 17 in the case the potting resin viscosity or the film filling ratio is high. FIG. 5 shows an example of the low pressure mechanism in the case of having the potting working part on one end part of the hollow fiber membrane module, and FIG. 6 shows an example of the low pressure mechanism in the case of having the potting working part on the both end parts of the hollow fiber membrane module.

For the low pressure mechanisms 17, for example, a method of installing a sealing container with the pressure preliminarily reduced in a state containing the potting working part, and a method of providing the pressure reducing function to the sealing container, that is, a method of having the inside of the pressure reducing container 17 always in a reduced pressure maintaining state by for example a small vacuum pump or a cylinder utilizing the spring force can be used.

In the case of the centrifugal potting process, since the substance to be applied with the centrifugal force has preferably a light weight in terms of the vibration and the durability of the centrifugal machine, as shown in the figure, it is preferable to use a method of reflecting the state of reduced pressure produced by a reduced pressure generator 19 to the low pressure mechanism 17 via a pressure reducing piping 18.

In this case, since the pressure reduction is executed during the rotating motion of the centrifugal machine, as a method of connecting the pressure reducing piping 18, although it is not particularly limited, it is preferable to use a known method such as a rotary joint (not shown).

The material of the sealed container used for the low pressure mechanism 17 is not particularly limited, and a composite material of a resin material, a metal material, a FRP, or the like can be used. Since the centrifugal heating potting process is executed, the material to be used preferably has a light weight and an insulation performance, and thus it is preferable to use a resin material or a composite material.

In this case, it is needless to say that a material durable to the temperature needed for the potting process can be used preferably.

Moreover, as to the shape of the sealing container used for the low pressure mechanism 17, it is not particularly limited, and a cylindrical shape, a rectangular shape, a spherical shape, and a combination thereof can be used, and it preferably has the pressure resistant performance necessary for having the reduced pressure environment in the inside. Moreover, it is preferable that the sealing container has a thickness necessary for realizing the pressure resistant performance.

As mentioned above, the sealing container may have a shape to provide the reduced pressure environment in the potting working part in an integrated form, or it may be installed with the heating mechanism for heating the potting working part or the airtight property provided.

As the method of providing the airtight property, use of a sealing member is a preferable method.

According to the centrifugal type production apparatus 10 of the present invention, it is more preferable to apply the centrifugal force of 10 to 100 times of the gravity to the potting working part 3 as mentioned above in a state with the environment of the potting working part under the reduced pressure atmosphere of 500 hPa or less by the low pressure mechanism 17.

That is, in the case the centrifugal force of less than 10 times of the gravity is applied to the potting working part 3, if the viscosity of the potting resin is slightly high, the hollow fiber membrane bundle comprises a large number of the hollow fiber membranes 1, or the filling ratio of the hollow fiber membranes 1 is high, not only the centrifugal force of 10 to 100 times of the gravity is applied to the potting working part 3, if the environment of the potting working part is under the reduced pressure atmosphere, a further preferable result tends to be provided to the impregnation in the hollow fiber membrane bundle with the potting resin.

In the case the centrifugal force of less than 10 times of the gravity is applied to the potting working part 3, even if the environment of the potting working part is under the reduced atmosphere, if the viscosity of the potting resin, or the hollow fiber membrane bundle comprises a large number of the hollow fiber membranes 1, or the filling ratio of the hollow fiber membranes 1 is extremely high, the hollow fiber membrane bundle can hardly be impregnated with the potting resin so as to generate the voids or pores in the potting working part. In contrast, in the case the gravity of more than 100 times of the gravity is applied to the potting working part, there is the risk of bending the hollow fiber membranes 1 due to the gravity so as to cause deterioration of the separation performance of the hollow fiber membranes or the transmission performance, damage of the hollow fiber membranes. Therefore, the centrifugal force to be applied at the time of executing the potting process is preferably 10 to 100 times of the gravity, and it is more preferably 20 to 80 times of the gravity.

It is preferable that the centrifugal type production apparatus 10 of the present invention comprises the mechanism of applying the centrifugal force to the potting resin, the low pressure mechanism 17 for having the environment of the potting working part in a reduced pressure atmosphere of 500 hPa or less, and furthermore, the mechanism for controlling the temperature of the fixing jig 4 for supporting the potting working part within ±4° C. to the setting temperature in order to further improve the impregnation effect and the production yield of the hollow fiber membrane module to be obtained.

That is, as mentioned above, according to the centrifugal type production apparatus 10 of the present invention, by controlling the temperature of the fixing jig 4 to the setting temperature within a range of ±4° C. by the controllable temperature control part 12, at the same time applying the centrifugal force to the potting working part, and furthermore, having the environment of the potting working part under a reduced pressure atmosphere, generation of the failure of the potting resin impregnation property can be restrained without generating slight temperature fluctuation or error so that the production yield of the hollow fiber membrane module to be obtained tends to be improved.

Moreover, it is preferable that the reduced pressure atmosphere of the potting working part to be achieved by the low pressure mechanism 17 is further preferably 350 hPa or less. That is, according thereto, a further effect can easily be obtained in terms of the reduction of the bubbles inside the potting resin so that generation of leakage of the hollow fiber membrane element can be reduced dramatically, and at the same time, it is an extremely effective means in the case the viscosity of the potting resin or the film filling ratio is high as mentioned above.

According to the centrifugal type production apparatus 10 of the present invention, the temperature of the fixing jig 4 can be set within a range of ±4° C. to the setting temperature. Particularly in the case of using a thermoplastic resin for the potting resin, the effect can be provided.

That is, since the thermoplastic resin in general has a high viscosity, the impregnation property between the hollow fiber membranes is not good. Therefore, it is preferable to heat the potting resin at a temperature as high as possible in a range without generating a trouble of crush due to melting and softening of the hollow fiber membranes for ensuring a good quality of the hollow fiber membrane module. Since the hollow fiber membranes are melted and softened by slight temperature fluctuation or error, or failure is generated in terms of the potting resin impregnation property, it is important that the required temperature range should be narrow, and thus it is an extremely effective means to control the temperature within a range of ±4° C. to the setting temperature, using the centrifugal type production apparatus 10 of the present invention.

As heretofore described, according to the centrifugal type production apparatus 10 of the present invention, by independently operating the fixing jig 4 for directly heating the potting working part 3 of the hollow fiber membrane module 2, the heating means 7 for heating the fixing jig 4, the temperature detecting means 8 for detecting the temperature, the temperature control part 12 for controlling the temperature accuracy of the fixing jig 4, the rotation driving part 14 for rotating the fixing jig 4 around the rotation axis 16 via the shaft 15, and the rotation control part 13 thereof so as to sufficiently achieve the performance with the interaction of the constituent parts, the temperature accuracy of the potting working part 3 can be provided in a range of ±4° C. to the setting temperature so that the potting temperature of the potting resin to be used can be heated to the vicinity of the melting point of the resin comprising the hollow fiber membranes 1, and thus the problems of the disturbance of the hollow fiber membrane module 2 and crush of the hollow fiber membranes, which have not been solved by the prior art, can be solved.

The potting working part 3 is preliminarily filled with the thermoplastic potting resin before the potting process by heating and the application of the centrifugal force. The filling method is not particularly limited, and for example, a method of preliminarily winding a film like potting resin around the hollow fiber membranes, a method of winding a fibrous material, a method of disposing pellets between the hollow fiber membranes, a method of disposing a powdery substance between the hollow fiber membranes, a method of disposing a paste like product with powders and a liquid mixed, a method of introducing a preliminarily melted potting resin between the hollow fiber membranes, or the like can be presented.

In particular, it is preferable to use the thermoplastic resin fine particles as the potting resin and fill the potting working part 3 with a mixture of the thermoplastic resin fine particles and a liquid since it facilitate even introduction of the potting resin in a gap between the hollow fiber membranes.

The mixture of the thermoplastic resin fine particles and the liquid can be any of a slurry with the thermoplastic resin fine particles simply dispersed in the liquid, an emulsion with the thermoplastic resin fine particles evenly emulsified by an emulsifying agent, a dispersing agent, or the like, a paste with a small amount of the liquid added to the thermoplastic resin fine particles, or the like.

Although the liquid for preparing the mixture of the thermoplastic resin fine particles and the liquid is not particularly limited, water, or an organic solvent such as alcohols and an ester based solvent can be utilized. The liquid for preparing the mixture of the thermoplastic resin fine particles and the liquid may either be a single liquid or a liquid mixture.

In the case a slurry with the thermoplastic resin fine particles simply dispersed in the liquid is used as the mixture of the thermoplastic resin fine particles and the liquid, the mixture can be produced by preparing a liquid having a specific gravity according to the density of the thermoplastic resin fine particles to be dispersed, and using the same.

For example, for the polyolefin based thermoplastic resin fine particles, it is preferable to produce the mixture of the liquid and the thermoplastic resin fine particles by preparing a liquid having a specific gravity according to the density of the thermoplastic resin fine particles to be dispersed by having a liquid mixture of water and a methanol or an ethanol.

According to the mixture of the thermoplastic resin fine particles and the liquid, since the volume reduction generated by the liquid to be evaporated and vanished at the time of the potting process is increased in the case the concentration of the thermoplastic resin fine particles in the mixture is lower than 10 wt %, the mixture needs to be applied for the impregnation between the hollow fiber membranes for the extra amount. This may lead to deterioration of the physical property of the outer surface of the hollow fiber membranes not fixed by the potting resin.

Moreover, in the case the concentration of the thermoplastic resin fine particles in the mixture is higher than 95 wt %, due to enlargement of the agglomeration among the thermoplastic resin fine particles, the even application of the mixture tends to be difficult. Therefore, it is preferable to use a mixture having 10 to 95 wt % thermoplastic resin fine particle concentration as the mixture of the thermoplastic resin fine particles and the liquid.

Furthermore, it is preferable that the mixture of the thermoplastic resin fine particles and the liquid has a softness capable of applying the thermoplastic resin fine particles as the potting resin in the mixture, and it can be supported on the spot without flowing away from the application spot in the case of being applied onto the hollow fiber membranes. Therefore, a thermoplastic resin fine particle paste having the Bingham flow without flowing without the active external force, that is, a paste having a 40 to 95 wt % thermoplastic resin fine particle concentration is preferable.

In the case the potting resin for filling the potting working part is a mixture with a liquid, it is preferable that the liquid in the mixture is completely eliminated by the potting process. That is, in the case the liquid remains in the potting part to be obtained by the potting process, the strength deterioration of the potting working part 3 derived from the residual liquid can be generated, or the module performance can be lowered due to the elution of the residual liquid.

Therefore, it is preferable that the liquid filling the potting working part 3 together with the potting resin is evaporated totally by heating at the time of the potting process.

As to the shape of the thermoplastic resin fine particles to be used the potting resin, those having any shape, such as spherical, rectangular, needle like, and elliptical can be used.

Furthermore, in the case the thermoplastic resin fine particles have too small a size, depending on the hollow fiber membranes to be used, there is the risk of having the thermoplastic resin fine particles passing through narrow holes formed in the film so as to close the internal hollow part of the hollow fiber membranes. Moreover, in the case it is too large, a gap can easily be generated among the fine particles supported between the hollow fiber membranes. If the potting process is executed with the gap remained, "pores" can be generated in the potting part to be obtained so as to cause the risk of leakage. Therefore, as for example the spherical thermoplastic resin fine particles, those having about 0.1 to 5,000 μm average particle size are preferable. Moreover, as the thermoplastic resin fine particles having the other shapes, those having a 0.01 to 5,000 μm average size of the shortest side and the longest side average size within a range of 0.1 to 5,000 μm are preferable.

Therefore, as the thermoplastic resin for the potting resin, although it is not particularly limited, as mentioned above, a silicone based filling agent or various hot melt resins can be used. In terms of the resistance to various solvents and chemicals, the mechanical strength, or the like, a polyolefin based resin is preferable. Among the polyolefin based resins, in terms of the handling property at the time of the potting process, the low elution to the chemicals, or the like, a polyethylene resin is preferable.

According to the centrifugal type production apparatus 10 of the present invention, since the temperature of the fixing jig 4 can be controlled within a range of ±4° C. to the setting temperature, particularly in the case of using the thermoplastic resin as the resin comprising the hollow fiber membranes 1, the effect can be achieved. Moreover, it is preferable to use the same kind of the resin as the potting resin in terms of having the physical properties such as the chemical resistance, the strength, or the like of the hollow fiber membrane module. By using the centrifugal type production apparatus 10, the even potting process can be enabled in the hollow fiber membrane module.

Therefore, as mentioned above, for the hollow fiber membranes, thermoplastic resin hollow fiber membranes are used in terms of the film formation stability at the time of obtaining the hollow fiber membranes 1, the chemical resistance, the common separation performance, the processing performance, or the like. In terms of the flexibility of the hollow fiber membranes, the strength, the material chemical resistance, the low cost performance, or the like required at the time of processing for obtaining the hollow fiber membrane module, the hollow fiber membranes made of a polyolefin based resin is preferable, and in particular, the hollow fiber membranes made of a polyethylene is preferable.

As to the production of the hollow fiber membrane module 2 using the centrifugal type production apparatus 10 of the present invention, a hollow fiber membrane module to be produced using a polyethylene resin both for the resin comprising the hollow fiber membrane and the potting resin is preferable in terms of the strength, the chemical resistance and the low cost. At the time, the melting point of the potting resin is preferably lower than the melting point of the resin comprising the hollow fiber membranes by 10° C. or more, and it is further preferably lower by 20° C. or more.

In this case, the temperature for heating the potting working part is preferably in the vicinity of the melting point of the resin comprising the hollow fiber membranes in terms of lowering the viscosity of the potting resin for preferable impregnation of between the hollow fiber membranes as mentioned above.

Specifically, it is preferable to heat the potting working part in a setting temperature range of lower than the melting point of the resin composing the hollow fiber membranes by 15° C. or more. A setting temperature range of lower by 9° C. or more is more preferable, and a setting temperature range of lower by 7° C. or more is further preferable. However, as to the setting temperature, there always exists the problem of the temperature accuracy of the heating means, in the case the heating temperature is set in the vicinity of the melting point of the resin compositing the hollow fiber membranes, the hollow fiber membranes may be melted and softened so as to generate deformation or crush in the case of the upper limit value of the temperature accuracy range. Therefore, the setting heating temperature is preferably in a range without generating crush, or the like due to melting and softening of the hollow fiber membranes with the temperature accuracy of the heating means taken into account so that the impregnation between the hollow fiber membranes or the potting resin can be enabled by the centrifugal type production apparatus 10.

From these viewpoints, according to the potting process of the conventional technique, a processing example of the hollow fiber membrane module filled with several hundreds of hollow fiber membranes is disclosed. In the case the inside of the module case is filled with the hollow fiber membranes of more than that, since the potting resin can hardly be introduced between the hollow fiber membranes evenly, the risk of forming the "pores" in the potting part of the hollow fiber membrane module to be obtained can be high.

In contrast, according to the production using the centrifugal type production apparatus 10 for the hollow fiber membrane module of the present invention, since a mechanism of applying the centrifugal force to the potting working part simultaneously with heating of the potting resin filled in the potting working part is provided, the potting resin can be introduced forcibly between the hollow fiber membranes. Thereby, even in the case the inside of the module case is filled with a large number of the hollow fiber membrane, or the filling ratio of the hollow fiber membranes is high, a preferable potting part can be formed.

According to the production using the centrifugal type production apparatus 10 of the hollow fiber membrane module of the present invention, the number of the hollow fiber membranes in the module case is preferably about 1,000 to 100,000, and furthermore, the filling ratio of the hollow fiber membranes to the potting working part volume is about 20 to 60%. Although the thickness of the hollow fiber membranes is not particularly set, if the outer diameter of the hollow fiber membranes is narrow, the potting resin can hardly be introduced due to the smallness of the gap between the hollow fiber membranes.

Moreover, in the case the outer diameter of the hollow fiber membranes is too large, the size of the entire module is enlarged at the time of providing the module with a large number of the hollow fiber membranes so that the volume of the potting working part is enlarged thereby, the size accuracy is deteriorated by the contraction at the time of the potting process. Therefore, the outer diameter of the hollow fiber membranes is preferably about 100 to 2,000 nm.

Hereinafter, the specific configuration of the production method for a hollow fiber membrane module of the present invention will be explained in detail with reference to the examples.

EXAMPLE 1

An emulsion of a potting resin comprising polyethylene fine powders dispersed was applied evenly onto a potting working part on one end part of a hollow fiber membrane comprising a sheet like hollow fiber membrane knitted fabric prepared by folding back continuously and regularly by a predetermined length of 16 sets of a hollow fiber membrane bundle comprising 6,400 pieces of polyethylene porous hollow fiber membrane (melting point: 132° C.) having a 320 μm outer diameter, a 200 μm inner diameter and a 0.03 μm pore size, and by binding the mutual end parts of the folded back hollow fiber membrane bundle with a thread.

The polyethylene fine powders used as the potting resin were spherical fine powders (average particle size: 6 μm) having a 84,000 weight average molecular weight, and an emulsion of a 30 wt % concentration water dispersion of the polyethylene fine powders was applied on the potting working part.

Then, the hollow fiber membrane knitted fabric was wound around in the hollow fiber membrane arrangement direction like a screen, and it was inserted into the polypropylene module case. The filling ratio of the hollow fiber membranes in the module case at the time was 38%.

Thereafter, the module case storing the hollow fiber membranes was fixed to the module case fixing jig 4 of the potting processing centrifugal type production apparatus 10 shown in FIG. 1. By rotating the rotation axis 16 while heating the entirety thereof, the centrifugal force was applied to the potting working part for executing the potting process.

The heating and centrifugal force application were executed for 4 hours while executing the PID control so as to have the heating temperature of the fixing jig at 127±3° C. at the time of the potting process and having the centrifugal force applied to the potting working part to 30 times of the gravity.

Subsequently, after cooling down slowly to the room temperature, the end part of the hollow fiber membranes in the portion with the potting process applied was cut by an ordinary method for forming an opening part so as to obtain a hollow fiber membrane module.

In the same manner, 10 sets of the hollow fiber membrane modules 10 were produced.

The obtained hollow fiber membrane modules can be used for filtration of a liquid or a gas. It was sealed tightly on the primary side and the secondary side in the potting part without leakage in any of the 10 sets. The leakage test of the hollow fiber membrane modules was executed by checking the water leakage from the end face while applying a hydraulic pressure of 0.5 MPa.

Moreover, after stopping the opening part of the hollow fiber membranes, a pressuring test was executed by repeating a cycle of applying a hydraulic pressure of 0.5 MPa from the outside of the hollow fiber membranes for 10 seconds and releasing the same for 10 seconds. Even after repeating the operation for 100,000 times, generation of cracking of the potting resin in the potting part or generation of leakage due to peel off with respect to the module case, or the like was not observed in any of the 10 sets.

COMPARATIVE EXAMPLE 1

A hollow fiber membrane module was obtained by applying the potting process in the same conditions as in the example 1 except that the heating temperature control to the potting working part at the time of the potting process was executed by the ON-OFF control instead of the PID control. The temperature of the fixing jig detected at the time was ±5° C. to the 127° C. setting temperature. In the same manner, 10 sets of the hollow fiber membrane modules were produced.

The same leakage test as in the example 1 was executed for the obtained hollow fiber membrane modules so as to find the water leakage from the end face part of the hollow fiber membrane modules in the 6 sets out of the 10 sets. As a result of the observation of the hollow fiber membrane modules, presence of the "pores" communicating the primary side and the secondary side was confirmed in the potting part of the 3 sets, and crush of the hollow fiber membranes, which is considered to be caused by melting of the hollow fiber membranes, was confirmed in the 4 sets.

EXAMPLE 2

10 sets of the hollow fiber membrane modules were produced by applying the potting process in the same conditions as in the example 1 except that a two liquid hardening type urethane resin (mixed resin viscosity 1,900 mPa·s) instead of the potting resin used in the example 1, the heating temperature control to the potting working part at the time of the potting process was executed by the ON-OFF control instead of the PID control, and the potting working part was under 490 hPa by the low pressure mechanism comprising a reduced pressure generator (produced by Shinku Kikou GVD050A) and a pressure reducing piping at the time of executing the potting process. The temperature of the fixing jig detected at the time was ±5° C. to the 30° C. setting temperature.

The same leakage test as in the example 1 was executed for the obtained hollow fiber membrane modules so as not to find leakage failure by checking the water leakage. Moreover, the same repeated pressuring test as in the example 1 was executed and generation of cracking of the potting resin in the potting part or generation of leakage due to peel off with respect to the module case, or the like was not observed in any of the 10 sets.

EXAMPLE 3

10 sets of the hollow fiber membrane modules were produced by applying the potting process in the same conditions as in the example 1 except that the concentration of the emulsion of the water dispersion of the polyethylene fine powders was 50 wt %, the filling ratio of the hollow fiber membranes in the module case was 40%, and the potting working part was under 490 hPa by the low pressure mechanism comprising a reduced pressure generator (produced by Shinku Kikou GVD050A) and a pressure reducing piping at the time of executing the potting process. The same leakage test as in the example 1 was executed for the obtained hollow fiber membrane modules so as not to find leakage failure by checking the water leakage. Moreover, the same repeated pressuring test as in the example 1 was executed and generation of cracking of the potting resin in the potting part or generation of leakage due to peel off with respect to the module case, or the like was not observed in any of the 10 sets.

EXAMPLE 4

10 sets of the hollow fiber membrane modules were produced by applying the potting process in the same conditions as in the example 1 except that the filling ratio of the hollow fiber membranes in the module case was 45%, and the potting working part was under 330 hPa by the low pressure mechanism.

The same leakage test as in the example 1 was executed for the obtained hollow fiber membrane modules so as not to find leakage failure by checking the water leakage. Moreover, the same repeated pressuring test as in the example 1 was executed and generation of cracking of the potting resin in the potting part or generation of leakage due to peel off with respect to the module case, or the like was not observed in any of the 10 sets.

As it is apparent from the explanation presented above, by the use of the centrifugal type production apparatus capable of executing the highly accurate temperature control with respect to a predetermined temperature as the present invention, a high quality hollow fiber membrane module comprising a potting part with the module case and the hollow fiber membranes bonded and fixed in a fluid-tight or airtight manner by the potting resin can be produced without deteriorating the characteristics of the hollow fiber membranes to be used.

Moreover, by having the potting working part in a desired pressure reduced state at the same time with the application of the centrifugal force, cracking of the potting resin in the potting part or generation of leakage due to peel off with respect to the module case, or the like can be avoided.

The invention claimed is:

1. A centrifugal type hollow fiber membrane module production apparatus for bonding and fixing together at least one end of a hollow fiber membrane and a module case, in which the hollow fiber membrane is stored, with a potting resin utilizing a centrifugal force, with the production apparatus comprising:
    a fixing jig that supports a potting working part of an end of the hollow fiber membrane module, and that is mounted for rotation about an axis to impart a centrifugal force to the jig;
    a rotation driver for rotating the jig about the axis to impart the centrifugal force to the jig;
    a heating device and a temperature detector disposed on the fixing jig; and
    a controller connected to the heating device and to the temperature detector to control a heating capacity of the heating device based on a calculated value of a difference between a temperature of the fixing jig detected by the temperature detector and a preliminarily set setting temperature of the fixing jig.

2. The production apparatus for a hollow fiber membrane module according to claim 1, wherein a temperature accuracy of the controller is in a range of ±4° C. to the setting temperature.

3. The production apparatus for a hollow fiber membrane module according to claim 1, wherein the rotation driver causes the centrifugal force applied to the potting working part to be in a range of 10 to 100 times the force of gravity.

4. The production apparatus for a hollow fiber membrane module according to claim 1, wherein the heating device and the temperature detector are supported on the fixing jig in a closely thermally contacted state.

5. The production apparatus for a hollow fiber membrane module according to claim 1 or claim 4, wherein the heating device is an electric heater.

6. The production apparatus for a hollow fiber membrane module according to claim 1, including a fluid sealed in a wall of the fixing jig, and comprising a portion of the heating device.

7. The production apparatus for a hollow fiber membrane module according to claim 1, wherein the production apparatus further comprises a rotation controller connected to the rotation driver to control a rotational frequency of the fixing jig.

8. The production apparatus for a hollow fiber membrane module according to claim 1, wherein: the fixing jig comprises at least two block members; and the controller includes a temperature control arrangement to control the respective block members at different respective temperatures.

9. The production apparatus for a hollow fiber membrane module according to claim 1, wherein the production apparatus further includes a pressure reducing mechanism to provide an environment for the potting working part of a decompressed condition of 500 hPa or less.

10. A centrifugal type hollow fiber membrane module production apparatus for bonding and fixing together at least one end of a hollow fiber membrane and a module case, in which the hollow fiber membrane is stored, with a potting resin utilizing a centrifugal force, said production apparatus consisting essentially of:
   a fixing jig that supports a potting working part of an end of the hollow fiber membrane module, and that is mounted for rotation about an axis to impart a centrifugal force to the jig;
   a rotation driver connected to rotate the jig about the axis to impart the centrifugal force to the jig;
   a pressure reducing mechanism that provides an environment with a decompressed condition of 500 hPa or less for the potting working part,
   a heating device and a temperature detector disposed on the fixing jig; and
   an output controller having an input connected to the temperature detector and an output connected to the heating device to control an output of the heating device based on temperature information of the fixing jig detected by the temperature detector.

11. A method for producing a hollow fiber membrane module, comprising the steps of:
   using the production apparatus for the hollow fiber membrane module according to claim 1;
   using a thermoplastic resin as the potting resin;
   calculating the difference between the temperature of the fixing jig detected by the temperature detector and the preliminarily set setting temperature of the fixing jig; and,
   bonding and fixing the end part of the hollow fiber membrane and the module case while controlling the heating capacity of the heating device based on the calculated difference value.

12. The method for producing a hollow fiber membrane module according to claim 11, wherein the potting resin comprises fine particles of a thermoplastic resin; and the step of bonding and fixing includes filling the potting working part with a mixture of the fine particles of the thermoplastic resin and a liquid.

13. The method for producing a hollow fiber membrane module according to claim 12, wherein the potting resin is a polyolefin based resin.

14. The method for producing a hollow fiber membrane module according to claim 11 or claim 13, wherein the potting resin is a polyethylene resin.

15. The method for producing a hollow fiber membrane module according to claim 11, wherein the step of bonding and fixing includes utilizing a filling ratio of the hollow fiber membrane to a volume of the potting working part of between 20% or more and 60% or less.

16. A method for producing a hollow fiber membrane module, comprises the steps of:
   using the production apparatus for the hollow fiber membrane module according to claim 1;
   using a thermoplastic resin as a component of the hollow fiber membrane;
   calculating the difference between the temperature of the fixing jig detected by the temperature detector and the preliminarily set setting temperature of the fixing jig; and,
   bonding and fixing the end part of the hollow fiber membrane and the module case while controlling the heating capacity of the heating device based on the calculated difference value.

17. The method for producing a hollow fiber membrane module according to claim 16, wherein the component of the hollow fiber membrane is a polyolefin based resin.

18. The method for producing a hollow fiber membrane module according to claim 17, wherein the component of the hollow fiber membrane is a polyethylene resin.

19. The method for producing a hollow fiber membrane module according to claim 16, wherein the step of bonding and fixing includes utilizing a filling ratio of the hollow fiber membrane to a volume of the potting working part of between 20% or more and 60% or less.

* * * * *